United States Patent Office 3,474,813
Patented Oct. 28, 1969

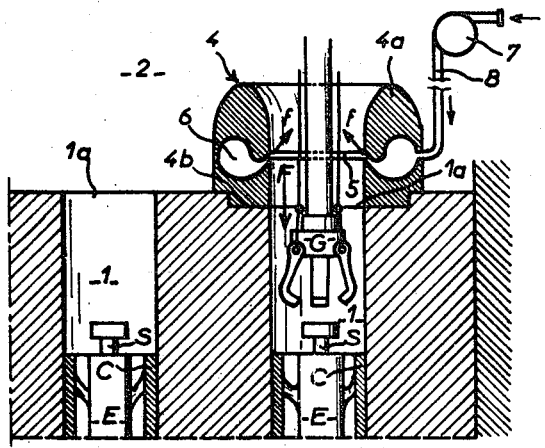
Fig.: 1
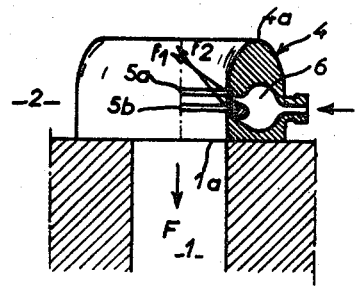
Fig.: 2
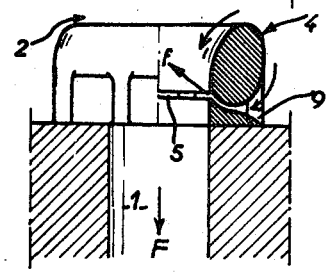
Fig.: 3
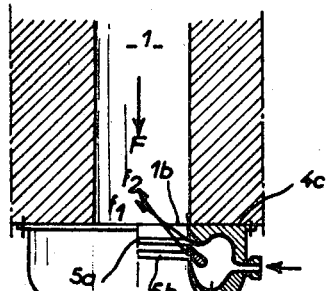
Fig.: 4

3,474,813
FLOW CONTROL DEVICE FOR MULTI-
CONDUIT STRUCTURES
Pierre Servanty, Aulnay-sous-Bois, and Paul Joseph
Adrien Chaumette, Paris, France, assignors to
Societe Nationale d'Etude et de Construction de
Moteurs d'Aviation, Paris, France
Filed Dec. 3, 1964, Ser. No. 415,649
Claims priority, application France, Dec. 7, 1963,
956,442; Dec. 9, 1963, 956,535
Int. Cl. F15c 1/18; G21c 15/00
U.S. Cl. 137—81.5
11 Claims

ABSTRACT OF THE DISCLOSURE

A device for controlling fluid flow in an apparatus having two spaced, fluid-filled manifolds interconnected by a plurality of parallel conduits establishing a flow path therebetween. The device being so shaped that it forms a substantially coaxial extension of a conduit when positioned thereon. Nozzle means in said device for producing a fluid flow counter to the flow path to effect a throttling thereof.

---

The invention relates to a device for controlling a flow through a conduit, by means of a substantially transverse auxiliary jet which exerts on the flow a restrictive action and is particularly applicable to the control of fluid through a conduit or tube in a nuclear reactor or other installation having a plurality of tubes in parallel, which communicate with a common intake manifold in which the pressure prevailing is higher than that existing at the outlet of the tubes, thereby giving rise to flow through them.

The present invention is particularly useful in connection with the problems which arise in the handling of fuel elements in nuclear reactors.

It is known for these fuel elements to be placed in tubes which are generally parallel to each other and which open at their opposite ends into inlet and outlet manifolds which together with the tubes contain a fluid such as, for example, carbon dioxide, water or sodium or other molten metal suitable for absorbing the heat produced by the fuel elements in the reactor tubes and for transferring it to heat exchangers where this heat is partially removed, the fluid circulating in a closed circuit. The circulation of the fluid through the tubes is ensured by maintaining in the inlet manifold and overpressure in relation to the outlet manifold, the fluid flow-rate in each tube being a function of the flow resistance encountered between the two ends of the tube.

It will be appreciated that regularity of the flow-rate of the heat-transferring fluid is of great importance.

Now, in the event of element-withdrawal during actual running, one or more fuel elements being withdrawn from a tube without, however, interrupting the operation of the installation or the general circulation of the heat-transferring fluid, the flow resistance encountered in the tube in question decreases greatly and, consequently, the flow-rate of the fluid passing through it increases to a considerable degree. Thus there results a rapid and substantial fall of temperature in the tube which has been unloaded, which fall is due to the cumulative effects of reduction in heat as a result of, on the one hand, the withdrawal of the heat-generating fuel elements and, on the other hand, the excessive flow of coolant fluid in this tube. This fall in temperature is all the more harmful because it is accompanied by a rise in temperature in the neighboring tubes. In fact, the substantial increase in the fluid flow-rate along the unloaded tube causes a starvation of the neighboring tubes, and in the case of these latter tubes, the decreased flow-rate will obviously give rise to overheating. In short, the result will be the formation of severe temperature gradients in the vicinity of the unloaded tube and of dangerous thermal stresses.

From another point of view, the increase in the flow-rate in the unloaded tube may give rise to particular difficulty when the last fuel element is to be withdrawn, since the force applied to it by the fluid current becomes very great—of the order of several times its weight. According to the direction of the flow, either the force required for extracting this last element will be excessive or there will be a risk of the element being swept away by the fluid current.

An object of the present invention is to avoid the difficulties that have just been mentioned by artificially creating a flow resistance which compensates for the decrease in flow resistance which would normally occur in the unloaded tube; thus the device serves as a flow-rate limiter.

A further object of this invention is to provide a device which is not incorporated in the tube which it is to regulate but constitutes an independent external assembly which can be associated with the tube for the purpose of regulating the flow-rate during unloading, but which can be withdrawn at the end of this operation, without at any time affecting the wholeness of the tube.

Apart from its advantages in relation to maintaining a regular flow-rate in the nuclear reactor tubes, the device according to the invention neither impedes nor disturbs handling of the fuel elements in any way. Another object of the invention is to provide a flow control device at an end of a conduit or tube and yet leave free access into it, so as to allow cleaning of said tube by means of suitable tools, if such be required, and also observation of its internal space, either visually or with the assistance of appropriate apparatus. These operations would be impossible or would be made extremely complex if use were made of valves or other mechanical appliances which operate by forming obstacles to flow and obstruct the tubes to a greater or lesser extent.

It should likewise be noted that the flow resistance brought about artificially by means of the restrictive device of the invention, with a view to compensating for the decrease in the flow resistance in the unloaded tube, is produced when required and is not permanent, since the restrictive jet either can be stopped at any time or the device can be removed from its position at the end of the tube. A single device would be sufficient for use with all the tubes of a reactor, provided that it is not required to carry out simultaneous handling operations in connection with several tubes.

A further object of the present invention is to provide a flow control device which, as has been stated above, is external to the tubes and independent of them, but which is however, incorporated with the fuel element handling apparatus which is normally provided in a nuclear reactor, and is movable with the grapnel or other gripping instrument of the fuel elements.

It is not essential however, for the device of the present invention to be removable from the tube; it could be permanently secured to it, so that every tube will have its own device.

The invention will now be described more fully, by way of example only, with reference to the accompanying drawings in which:

FIGURE 1 is a diagrammatic vertical section showing the fitting, at the inlet to one of the conduits of a nuclear reactor, of a restrictive device constructed according to the present invention, the device being incorporated in a handling unit for the fuel elements, only the grapnel of the unit being shown in the drawing, for the sake of simplicity;

FIGURE 2 shows a modification of the device, partly in section;

FIGURE 3 is a corresponding view of another modification which is considered to be preferable; and FIGURE 4 shows, partly in section, a device similar to that shown in FIGURE 2, but adapted for use at the outlet of a conduit.

In the drawings there is shown a nuclear reactor having a plurality of vertical conduits or tubes 1 extending in parallel between a common inlet manifold 2 (FIGURES 1 to 3) at relative high pressure and a common outlet manifold 3 (FIGURE 4) at relative low pressure, so that a flow of fluid is set up along each tube in the direction of the arrow F, the flow-rate depending on the flow resistance along the tube.

This flow-rate may be regulated by means of a fluidly operating throttling or restrictive device which has the general form of a toric element 4 with a minimum internal diameter equal to or slightly greater than that of the tubes and which is provided, at its throat, with a blowing slot or annular nozzle 5 directed towards the axis of the toric element but in a direction $f$ inclined th opposite way to the direction of flow F, the angle included between the two directions $f$ and F amounting advantageously to between 120° and 160°.

In the embodiment shown in FIGURE 1, the toric element 4 is located in the inlet manifold 2 and is fitted to the inlet end 1a of the tube 1, so as to form an upward extension of the latter. It has an upper streamlined rim 4a bounding a rounded leading edge and a planar transverse lower face 4b adapted to be applied against the periphery of the inlet 1a of the tube which is to be controlled.

The blowing slot 5 communicates with a supply manifold 6 which is also toric and is arranged in the body of the element 4. It is supplied with fluid under pressure, delivered by a pump 7 which sucks into the inlet manifold 2 and which is linked to the supply manifold 6 by a flexible pipe 8, a valve (not shown) being interposed if so required.

The device described operates in the following manner:

The toric element 4, which is removable, is placed in position at the inlet to that tube 1, whose flow-rate is to be regulated. The element 4 is shaped as an inverted diffuser so that the fluid starting from a state of rest in the manifold 2, assumes a progressively increasing speed of flow in the tube 1.

If the internal manifold 6 is supplied with fluid which is raised by the pump 7 to a total pressure higher than the static pressure of the main flow at the level of the blowing slot 5, the latter will emit an auxiliary restrictive jet $f$ in the general form of a conical stream, causing local throttling of the flow, associated with an annular vortex in the zone of its wake. As a result, a restrictive effect is applied to the flow which varies with the feed pressure of the manifold 6.

Restrictive effects of this kind are well known and exemplified by Patent 2,213,121 to Davy. It suffices to say that practically continuous regulation of the flow-rate between a minimum that is substantially zero and a maximum which is equal to the normal unrestricted flow-rate may be obtained simply by modifying the pressure of fluid in the manifold 6, for example by means of a valve.

The restrictive device 4 does not create any material obstruction in the tube 1. In particular, it allows free passage through the body thereof to a grapnel G for carrying out handling operations on the fuel elements placed in the tubes. At E there is shown diagrammatically an ordinary element with its graphite coating C and upper grooved part S, intended to be grasped by the grapnel G. It will be clearly seen that the grapnel may be pushed without difficulty into the tube 1, that it may grasp the fuel element E by means of the grooved part S and may withdraw the element with equal facility past the device 4.

The latter may be combined with the handling equipment of which the grapnel G is a part and will be movable with it, so as to be positioned at the top of a selected tube.

In the modified device shown in FIGURE 2, the manifold 6 ends with two annular blowing slots 5a and 5b, situated one beneath the other in adjacent transverse planes and directed in the directions $f1$ and $f2$ which intersect at a position between the slots and the axis of the element 4, at a distance from the axis. The restrictive effect is thereby improved; the auxiliary jet emerging from the downstream slot 5b acts in a zone having an even weaker static pressure, which is located behind the auxiliary jet emerging from the upstream slot 5a, and gains enhanced efficiency by reason of this fact; on the other hand, the downstream auxiliary jet $f2$ applies pressure to the upstream auxiliary jet $f1$ and displaces towards the axis, the zone in which the latter bends back in the direction of the main flow F.

FIGURE 3 shows the preferred embodiment of the invention, in which the toric body has an appropriately profiled transverse annular passage 9 therein, which opens by way of the blowing slot 5; there is no pump or connecting pipe and this construction is quite suitable in the event of the range of throttling being small.

In this event, the total pressure $P_t$ of the auxiliary fluid in the slot 5 is very nearly equal to the pressure prevailing in the inlet manifold 2, while the static pressure $P_s$ of the main flow at a level with the slot 5 is lower than the pressure in the manifold 2 by an amount equal to the dynamic pressure $P_d$ due to the flow speed in the tube 1. This is quite obvious since $P_t$ is roughly constant and equal to $P_s+P_d$ and since $P_d$ is negligible in the manifold 2 but relatively high at the throat 4 where slot 5 opens. It should be noted that any casual increase of velocity in the tube 1 increases correspondingly the difference between the total pressure $P_t$ in the slot 5 and the static pressure $P_s$ in the main flow at a level with said slot, this resulting in an increase in the magnitude of the restrictive action on the flow n the tube; the opposite would obtain if there were a reduction of velocity. In other words, a self-regulating effect is obtained, and this with a device of great simplicity which is of only small cost, since no pump or other special means are required for feeding and connection.

These advantages make the device suitable for permanent installation on each of the tubes of the reactor. Thus, without any intervention on the part of an operator, automatic regulation of the flow-rate in the various tubes will be obtained; in the case of any casual variation of flow-rate in any tube, the self-regulating effect explained above would bring about a return to normal.

In the embodiments already referred to, the fitting of the restrictive device to the inlet of the tube has been described. However, it will be clear that the invention is in no way limited to this arrangement and that the device could be adapted for installation at the outlet end 1b of the tube to be controlled, as is shown in FIGURE 4, that is to say, for installation at the mouth of the tube which opens into the outlet manifold 3. Naturally the toric element 4 will then have a transverse planar upper face 4c and a streamlined lower trailing edge 4d, the blowing slot or slots such as 5a and 5b, however, still being inclined in the upstream direction.

It will be obvious that the invention is equally applicable to the control of gaseous flows as well as liquid flows and, consequently, it is suitable for both gas-cooled reactors (using carbon dioxide, for instance) and to boiling water reactors or even molten metal reactors (using molten sodium, for instance).

What is claimed is:

1. In a nuclear reactor having two separate, spaced manifolds containing a heat carrier fluid at different pressures, a plurality of open-ended straight conduits extending in parallel flow relationship between said manifolds and opening thereinto so that a flow of said fluid is established through each conduit from the higher pressure manifold to the lower pressure manifold, elongated nuclear fuel elements accommodated in said conduits and contacted by said fluid flow therethrough, said fuel elements being movable longitudinally of said conduits to be engaged thereinto or withdrawn therefrom through an open end thereof, and a fluidly operating throttling device for controlling the fluid flow through a conduit, said throttling device comprising a tubular member projecting into one of said manifolds and fitted at the corresponding open end of one of said conduits forming a substantially coaxial prolongation thereof without causing any substantial obstruction of the passage area thereof, and nozzle means in said member for producing an annular sheet-like jet crosswise of the fluid flow through said tubular member to thereby exert a throttling restriction of said flow.

2. A throttling device as claimed in claim 1, wherein said tubular member has an inner cross section of substantially the same shape and size as the cross section of the corresponding conduit whereby the inner surface of said tubular member forms a smooth extension of the inner surface of said conduit.

3. A throttling device as claimed in claim 1, wherein said nozzle means comprises two successive nozzles positioned one downstream of the other and both inclined upstream in directions which converge and intersect.

4. A throttling device as claimed in claim 1, wherein said tubular member comprises, at the end thereof adjacent the corresponding conduit, a transverse planar face adapted to engage the periphery of the adjacent open end of said conduit, said tubular member further comprising, at the opposite end thereof, a streamlined rim.

5. A throttling device as claimed in claim 4, wherein said tubular member projects into said higher pressure manifold and said streamlined rim forms a smoothly curved leading edge.

6. A throttling device as claimed in claim 4, wherein said tubular member projects into said lower pressure manifold and said streamlined rim forms a smoothly curved trailing edge.

7. A throttling device as claimed in claim 1, wherein said tubular member is movable within the confines of one of said manifolds to be selectively fitted on the corresponding open end of any of said conduits to control the flow therethrough, and withdrawn therefrom without affecting the wholeness of said conduit.

8. A reactor as claimed in claim 1, further comprising a mechanical system for handling fuel elements, which is movable within the confines of one of said manifolds and which includes a fuel element gripping means operable inside a conduit, said tubular member being incorporated with said movable handling system and arranged to be freely traversable by said gripping means.

9. A reactor as claimed in claim 1, wherein each conduit is equipped with its own flow control device permanently attached thereto by a tubular member being secured to an end of each conduit.

10. A throttling device as claimed in claim 1, wherein said tubular member comprises an inner surface of progressively evolving outline from end to end, designed for accommodating a progressive evolution of the fluid flow velocity therethrough between two substantially different values, namely, a relatively low value at said end thereof projecting into said manifold and a relatively high value at said end thereof adjacent the corresponding conduit.

11. A throttling device as claimed in claim 10, wherein said nozzle means open into a portion of said tubular member at which the flow velocity value is close to said relatively high value, and are supplied with fluid tapped from said manifold.

References Cited

UNITED STATES PATENTS

| 2,213,121 | 8/1940 | Davy | 137—81.5 |
| 2,265,737 | 12/1941 | McMahan | 137—81.5 |
| 2,692,800 | 10/1954 | Nichols | 137—81.5 |
| 2,793,493 | 5/1957 | Kadosch | 239—265.17 |
| 2,894,892 | 7/1959 | Zinn | 214—18 |
| 2,948,148 | 7/1960 | De Jurguet | 137—81.5 |

FOREIGN PATENTS 759,659   10/1956   Great Britain.

M. CARY NELSON, Primary Examiner

WILLIAM R. CLINE, Assistant Examiner

138—39; 176—30